United States Patent [19]

Patel et al.

[11] Patent Number: 5,431,930
[45] Date of Patent: Jul. 11, 1995

[54] CHEWING GUM CONTAINING MEDIUM CHAIN TRIGLYCERIDES

[75] Inventors: Mansukh M. Patel, Downers Grove; Edward Dubina, Chicago, both of Ill.

[73] Assignee: Wm. Wrigley Jr. Co., Chicago, Ill.

[21] Appl. No.: 292,794

[22] Filed: Aug. 18, 1994

Related U.S. Application Data

[63] Continuation-in-part at PCT/US94/05771, May 27, 1994

[51] Int. Cl.⁶ .............................................. A23G 3/30
[52] U.S. Cl. ........................................... 426/3; 426/661
[58] Field of Search ........................................ 426/3–6, 426/661

[56] References Cited

U.S. PATENT DOCUMENTS

| | | | |
|---|---|---|---|
| 2,193,873 | 3/1940 | Jordan | 426/661 |
| 4,378,374 | 3/1983 | Reggio et al. | 426/3 |
| 4,446,157 | 5/1984 | Boden et al. | 426/3 |
| 4,452,820 | 6/1984 | D'Amelia et al. | 426/3 |
| 4,604,288 | 8/1986 | Glass et al. | 426/5 |
| 4,752,485 | 6/1988 | Sharma et al. | 426/99 |
| 4,904,482 | 2/1990 | Patel et al. | 426/3 |
| 5,041,293 | 8/1991 | Patel et al. | 426/3 |
| 5,135,761 | 8/1992 | Dave et al. | 426/5 |
| 5,145,708 | 9/1992 | Patel et al. | 426/662 |
| 5,156,866 | 10/1992 | Sato et al. | 426/5 |

FOREIGN PATENT DOCUMENTS

| | | |
|---|---|---|
| 0380066 | 1/1990 | European Pat. Off. |
| 58-146241 | 11/1983 | Japan |
| WP89/00847 | 2/1989 | WIPO |

*Primary Examiner*—Jeanette Hunter
*Attorney, Agent, or Firm*—Hill, Steadman & Simpson

[57] ABSTRACT

Improved chewing gum formulations and bases including lecithin, as well as methods of producing chewing gum and bases are provided. The chewing gum includes a blend of lecithin and medium chain triglycerides (MCTs). The blend can be used in the base and/or gum as a plasticizer, softener, and/or emulsifier. A variety of base and chewing gum formulations including the blend can be created and/or utilized pursuant to the present invention.

20 Claims, No Drawings

CHEWING GUM CONTAINING MEDIUM CHAIN TRIGLYCERIDES

BACKGROUND OF THE INVENTION

This is a continuation-in-part of PCT Patent Application No. PCT/US Ser. No. 94/05771 filed on May 27, 1994 entitled: "Improved Chewing Gum Containing Medium Chain Triglycerides."

The present invention relates generally to chewing gum. More specifically, the present invention relates to improved formulations for chewing gum and bases.

Chewing gum generally consists of a water insoluble gum base and a water soluble portion along with flavors. The water soluble portion and flavors dissipate during chewing and the gum base is retained in the mouth throughout the chew.

The insoluble gum base generally comprises elastomers, resins, fats and oils, softeners, and inorganic fillers. Elastomers can include synthetic elastomers including polyisobutylene, isobutyleneisoprene copolymers, styrene-butadiene copolymers, polyvinyl acetate, polyisoprene, polyethylene, vinyl acetate—vinyl laurate copolymers, and combinations thereof. Natural elastomers that can be used include natural rubber.

The gum base can include elastomer plasticizers. Such elastomer plasticizers can include natural rosin esters, as well as other elastomer plasticizers. Additionally, the gum base can include fillers/texturizers and softeners/emulsifiers. Softeners are added to chewing gum in order to optimize the chewability and mouth feel of the gum. Softeners/emulsifiers that are typically used include tallow, hydrogenated tallow, hydrogenated and partially hydrogenated vegetable oils, cocoa butter, glycerol monostearate, glycerol triacetate, lecithin, and combinations thereof.

In addition to a water insoluble gum base portion, a typical chewing gum composition includes a water soluble portion and one or more flavoring agents. The water soluble portion can include bulk sweeteners, high intensity sweeteners, flavoring agents, softeners, emulsifiers, colors, acidulants, fillers, antioxidants, and other components that provide desirable attributes.

It is known to use lecithin in chewing gum. The lecithin functions as an emulsifier/softener. In order to add lecithin to other chewing gum ingredients, the lecithin is typically dissolved in soybean oil or a vegetable oil containing soybean oil. For example, it is known to use a lecithin blend that contains 63% lecithin and 37% soybean oil.

Although lecithin can be dissolved in soybean oil, unfortunately, soybean oil has a very undesirable odor. Additionally, in chewing gum soybean oil can create off flavor notes.

However, if lecithin is not sufficiently dissolved, manufacturing problems can be encountered when the lecithin in a liquid carrier is added to other chewing gum ingredients. For example, if one attempted to use a 95% particulate form of lecithin without the appropriate liquid carrier, the lecithin will not disperse evenly when mixed into the gum. This will make it difficult, if at all possible, to manufacture a quality chewing gum.

The use and addition of lecithin in chewing gum has been described in a number of patents including U.S. Pat. Nos.: 5,141,293; 5,145,708; 4,904,482; 5,135,761; 2,193,873; 4,752,485; and 4,604,288, as well as PCT 89-000847 and EPO Patent No. 0,380,066.

SUMMARY OF THE INVENTION

The present invention provides improved chewing gum formulations and bases including lecithin, as well as methods of producing chewing gum and bases that include lecithin.

To this end, the present invention provides a chewing gum formulation comprising an insoluble gum base, a water soluble portion, a flavor, and at least 0.1% by weight of a blend of particulate lecithin and medium chain triglycerides.

For the sake of brevity, as used herein below when referring to the present invention and in the claims, lecithin refers to particulate lecithin.

In an embodiment, the medium chain triglycerides are obtained from coconut oil.

In an embodiment, the formulation includes a bulk sweetener.

In an embodiment, the formulation includes a high intensity sweetener.

In an embodiment, the formulation includes an emulsifier.

In an embodiment, the formulation includes an elastomer plasticizer.

In an embodiment, the formulation includes an elastomer.

In an embodiment, the ratio of lecithin to medium chain triglycerides is approximately 1:10 to about 1:1.

In an embodimeric, a gum base is provided comprising an elastomer and at least 0.1% by weight of a blend of lecithin and medium chain triglycerides.

In an embodiment, the base is wax-free.

In an embodiment, the base is non-tacky.

In an embodiment, the base is a bubble gum-type base.

In an embodiment, the base includes at least one resin.

In still another embodiment, the present invention provides a method for creating chewing gum comprising the steps of blending lecithin with medium chain triglycerides to create a blend and adding the blend to other chewing gum ingredients to create a chewing gum.

In an embodiment, the ratio of lecithin to medium chain triglycerides in the blend is approximately 1:10 to about 1:1.

In an embodiment, the blend comprises 0.1 to 1.5% of the chewing gum formulation.

In yet another embodiment, a method for dissolving lecithin is provided comprising the steps of blending lecithin with medium chain triglycerides.

In an embodiment, the ratio of lecithin to medium chain triglycerides in the blend is approximately 1:10 to about 1:1.

It is an advantage of the present invention to provide an improved chewing gum formulation including lecithin.

Another advantage of the present invention is that it provides an improved method for adding lecithin to other chewing gum ingredients.

Still further, an advantage of the present invention is that it provides chewing gum including lecithin but not having off flavor notes caused by vegetable oil carriers.

Additionally, an advantage of the present invention is that it provides a method, that does not create manufacturing issues, for adding lecithin to other chewing gum ingredients.

Moreover, an advantage of the present invention is that it provides an improved method for dissolving lecithin so it can be used to create chewing gum.

Furthermore, an advantage of the present invention is that it provides a carrier for dissolving lecithin that is also itself an emulsifier/softener.

Still further, an advantage of the present invention is that it provides a method for adding lecithin to a chewing gum formulation that provides for an even dispersion of the lecithin in the chewing gum.

Additional features and advantages of the present invention are described in, and will be apparent from, the detailed description of the presently preferred embodiments.

DETAILED DESCRIPTION OF THE PRESENTLY PREFERRED EMBODIMENTS

The present invention provides improved chewing gum formulations including lecithin and methods of manufacturing same. Pursuant to the present invention, medium chain triglycerides (MCTs) are blended with lecithin to create a lecithin containing composition that can be added to other chewing gum ingredients to create chewing gum. The MCTs that carry the lecithin also can be used as softeners, plasticizers, and/or emulsifying agents in the chewing gum formulation. As a carrier for the lecithin, the MCTs provide a blend that affords the benefits of lecithin but without an uneven dispersion of the lecithin and the traditional off flavor notes which are caused by vegetable oil carriers.

Medium chain triglycerides (MCTs) are fat/oil substances that can be obtained from the fractionation of coconut oil. MCTs are made up of a mixture of medium chain fatty acids (MCFA) ranging from caproic to lauric ($C_6$-$C_{12}$) in its triglyceride form. Fractionated coconut oil is generally about 95% caproic ($C_8$:O) and caprylic ($C_{10}$:O). The triglycerides of coconut oil are heat hydrolyzed to form free fatty acid and glycerol, and to methyl esters of fatty acids. The esters are fractionally distilled to separate the medium chain fatty acids and reesterified with glycerol to form MCTs.

MCTs are a clear, tasteless, odorless product that have a low viscosity and good spreadability. MCTs are somewhat more soluble in water than long chain triglycerides. Due to the tasteless and odorless properties of MCTs they can function as a good flavor carrier and solvent and can be used in candy as a release agent.

It is believed that at the present time, the United States Food & Drug Administration is considering MCTs under a GRAS Affirmation petition. Medium chain triglycerides (MCTs) are available from Stepan Company of Maywood, N.J. under the tradename NEOBEE ® M-5, as well as from Karlshamns of Columbus, Ohio under the tradename CAPTEX ®.

Pursuant to the present invention, MCTs are used to dissolve lecithin and the resultant product can be used in base or chewing gum formulations. In this regard, the lecithin/MCT blend can be used as a softener, plasticizer, and/or emulsifying agents. The lecithin/MCT product can be used in a variety of different chewing gum and base formulations.

Chewing gum generally consists of a water insoluble gum base, a water soluble portion, and flavors.

The insoluble gum base generally comprises elastomers, resins, fats and oils, softeners, and inorganic fillers. The gum base may or may not include wax. The insoluble gum base can constitute approximately 5 to about 95 percent, by weight, of the chewing gum, more commonly, the gum base comprises 10 to about 50 percent of the gum, and in some preferred embodiments, 20 to about 35 percent, by weight, of the chewing gum.

In an embodiment, the chewing gum base of the present invention contains about 20 to about 60 weight percent synthetic elastomer, 0 to about 30 weight percent natural elastomer, about 5 to about 55 weight percent elastomer plasticizer, about 4 to about 35 weight percent filler, about 5 to about 35 weight percent softener, and optional minor amounts (about one percent or less) of miscellaneous ingredients such as colorants, antioxidants, etc.

Synthetic elastomers may include, but are not limited to, polyisobutylene with a GPC weight average molecular weight of about 10,000 to about 95,000, isobutylene-isoprene copolymer (butyl elastomer), styrene-butadiene copolymers having styrene-butadiene ratios of about 1:3 to about 3:1, polyvinyl acetate having a GPC weight average molecular weight of about 2,000 to about 90,000, polyisoprene, polyethylene, vinyl acetate-vinyl laurate copolymer having vinyl laurate content of about 5 to about 50 percent by weight of the copolymer, and combinations thereof.

Preferred ranges are, for polyisobutylene, 50,000 to 80,000 GPC weight average molecular weight, for styrene-butadiene, 1:1 to 1:3 bound styrene-butadiene, for polyvinyl acetate, 10,000 to 65,000 GPC weight average molecular weight with the higher molecular weight polyvinyl acetates typically used in bubble gum base, and for vinyl acetate-vinyl laurate, vinyl laurate content of 10–45 percent.

Natural elastomers may include natural rubber such as smoked or liquid latex and guayule as well as natural gums such as jelutong, lechi caspi, perillo, sorva, massaranduba balata, massaranduba chocolate, nispero, rosindinha, chicle, gutta hang kang, and combinations thereof. The preferred synthetic elastomer and natural elastomer concentrations vary depending on whether the chewing gum in which the base is used is adhesive or conventional, bubble gum or regular gum, as discussed below. Preferred natural elastomers include jelutong, chicle, sorva and massaranduba balata.

Elastomer plasticizers may include, but are not limited to, natural rosin esters, often called estergums, such as glycerol esters of partially hydrogenated rosin, glycerol esters polymerized rosin, glycerol esters of partially dimerized rosin, glycerol esters of rosin, pentaerythritol esters of partially hydrogenated rosin, methyl and partially hydrogenated methyl esters of rosin, pentaerythritol esters of rosin; synthetics such as terpene resins derived from alpha-pinene, beta-pinene, and/or d-limonene; and any suitable combinations of the foregoing. The preferred elastomer plasticizers will also vary depending on the specific application, and on the type of elastomer which is used.

Fillers/texturizers may include magnesium and calcium carbonate, ground limestone, silicate types such as magnesium and aluminum silicate, clay, alumina, talc, titanium oxide, mono-, di- and tri-calcium phosphate, cellulose polymers, such as wood, and combinations thereof.

In an embodiment, in addition to the lecithin/MCT blend, pursuant to the present invention, the chewing gum formulation may include other softeners/emulsifiers including tallow, hydrogenated tallow, hydrogenated and partially hydrogenated vegetable oils, cocoa butter, glycerol monostearate, glycerol triacetate, mono-, di- and triglycerides, acetylated monoglycerides, fatty acids (e.g. stearic, palmitic, oleic and linoleic acids), and combinations thereof.

Colorants and whiteners may include FD&C-type dyes and lakes, fruit and vegetable extracts, titanium dioxide, and combinations thereof.

The base may or may not include wax. An example of a wax-free gum base is disclosed in U.S. Pat. No. 5,286,500, the disclosure of which is incorporated herein by reference.

In addition to a water insoluble gum base portion, a typical chewing gum composition includes a water soluble bulk portion and one or more flavoring agents. The water soluble portion can include bulk sweeteners, high intensity sweeteners, flavoring agents, softeners, emulsifiers, colors, acidulants, fillers, antioxidants, and other components that provide desired attributes.

The softeners, which are also known as plasticizers and plasticizing agents, generally constitute between approximately 0.5 to about 15% by weight of the chewing gum. The softeners, pursuant to the present invention, will comprise a lecithin/MCT blend. However, other softeners can also be used including glycerin, aqueous sweetener solutions such as those containing sorbitol, hydrogenated starch hydrolysates, corn syrup and combinations thereof.

Bulk sweeteners include both sugar and sugarless components. Bulk sweeteners typically constitute 5 to about 95% by weight of the chewing gum, more typically, 20 to 80% by weight, and more commonly, 30 to 60% by weight of the gum.

Sugar sweeteners generally include saccharide-containing components commonly known in the chewing gum art, including, but not limited to, sucrose, dextrose, maltose, dextrin, dried invert sugar, fructose, levulose, galactose, corn syrup solids, and the like, alone or in combination.

Sorbitol can be used as a sugarless sweetener. Additionally, sugarless sweeteners can include, but are not limited to, other sugar alcohols such as mannitol, xylitol, hydrogenated starch hydrolysates, maltitol, and the like, alone or in combination.

High intensity artificial sweeteners can also be used in combination with the above. Preferred sweeteners include, but are not limited to sucralose, aspartame, salts of acesulfame, alitame, saccharin and its salts, cyclamic acid and its salts, glycyrrhizin, dihydrochalcones, thaumatin, monellin, and the like, alone or in combination. In order to provide longer lasting sweetness and flavor perception, it may be desirable to encapsulate or otherwise control the release of at least a portion of the artificial sweetener. Such techniques as wet granulation, wax granulation, spray drying, spray chilling, fluid bed coating, coacervation, and fiber extension may be used to achieve the desired release characteristics.

Usage level of the artificial sweetener will vary greatly and will depend on such factors as potency of the sweetener, rate of release, desired sweetness of the product, level and type of flavor used and cost considerations. Thus, the active level of artificial sweetener may vary from 0.02 to about 8%. When carriers used for encapsulation are included, the usage level of the encapsulated sweetener will be proportionately higher.

Combinations of sugar and/or sugarless sweeteners may be used in chewing gum. Additionally, the softener may also provide additional sweetness such as with aqueous sugar or alditol solutions.

If a low calorie gum is desired, a low caloric bulking agent can be used. Example of low caloric bulking agents include: polydextrose; Raftilose, Raftilin;Fructooligosaccharides (NutraFlora);Palatinose oligosaccharide; Guar Gum Hydrolysate (Sun Fiber); or indigestible dextrin (Fibersol). However, other low calorie bulking agents can be used.

A variety of flavoring agents can be used. The flavor can be used in amounts of approximately 0.1 to about 15 weight percent of the gum, and preferably, about 0.2 to about 5%. Flavoring agents may include essential oils, synthetic flavors or mixtures thereof including, but not limited to, oils derived from plants and fruits such as citrus oils, fruit essences, peppermint oil, spearmint oil, other mint oils, clove oil, oil of wintergreen, anise and the like. Artificial flavoring agents and components may also be used. Natural and artificial flavoring agents may be combined in any sensorially acceptable fashion.

The present invention, it is believed, can be used with a variety of processes for manufacturing chewing gum.

Chewing gum is generally manufactured by sequentially adding the various chewing gum ingredients to commercially available mixers known in the art. After the ingredients have been thoroughly mixed, the chewing gum mass is discharged from the mixer and shaped into the desired form, such as by rolling into sheets and cutting into sticks, extruding into chunks, or casting into pellets.

Generally, the ingredients are mixed by first melting the gum base and adding it to the running mixer. The gum base may alternatively be melted in the mixer. Color and emulsifiers can be added at this time.

Pursuant to the present invention, MCTs in their typical liquid form are blended with lecithin. Preferably, the lecithin and MCTs are blended at a ratio of 1:1 to about 10:1. The resultant lecithin/MCT blend can then be added to the other chewing gum ingredients at a variety of points during the manufacturing process.

The lecithin/MCT product may be added at any time during processing of the base, but preferably, is added near the end of the batch to act as a softener. The lecithin/MCT blend may be added to conventional bases that contain wax or to wax-free bases. Likewise, the lecithin/MCT blend can be added to bases that may or may not contain polyvinyl acetate or terpene resins, or bases that contain natural gums or synthetic bases. Further, the lecithin/MCT blend can be added to bases that are non-tacky, or are bubble gum bases.

Preferably, the lecithin/MCT blend will be added so that it comprises 2.5 to 15.0% by weight of the base.

At levels of approximately 0.02% to about 20% by weight of the gum base, the MCTs in the blend may replace some or most of the partially hydrogenated or hydrogenated vegetable oils, mono- and di-glycerides, acetylated monoglycerides, or other softeners used in the gum base. A chewing gum base made with a lecithin/MCT blend will have greater oxidative stability due to the presence of MCTs, and will afford the chewing gum a cleaner taste due to a reduction of off-tasting fats and oils.

The lecithin/MCT blend may also be added to a chewing gum formulation in its liquid form during processing of the chewing gum. The lecithin/MCT blend may be added during the gum manufacturing at any time during processing, but preferably, early in the batch to allow thorough mixing with the gum base.

Preferably, the lecithin/MCT blend will be added to the chewing gum formulation so that it comprises approximately 0.1% to about 1.5% by weight of the chewing gum formulation. In a preferred embodiment, the lecithin/MCT blend comprises approximately 0.3% to about 0.8% and most preferably, about 0.5% to about 0.7% by weight of the chewing gum formulation.

The lecithin/MCT blend may be blended with other softeners such as lecithin, glycerol triacetate, acetylated monoglycerides, mono- and di-glycerides, or other vegetable oils and fats that may be added to a gum formulation. It has been found that lecithin when mixed with MCTs will allow for an easier dispersion of lecithin in a gum formulation. This should be contrasted with soy bean oil that is typically used as a carrier for lecithin. Unfortunately, soy bean oil has some off-taste and becomes rancid with time; but particulate lecithin in MCTs gives a clean taste with good oxidation stability.

MCTs may also be blended with a wide range of natural and artificial flavor oils and act as a carrier for flavor oils. The clean, tasteless, and odorless properties of MCTs makes it an excellent carrier for flavors such as spearmint, peppermint, cinnamon, wintergreen, and fruit flavors. The level of MCTs mixed with fruit flavors can vary over a wide range from approximately 1% to about 99% by weight since most gum flavors are oil soluble.

MCTs can also act as a carrier for artificial and natural colors such as in FD&C lake dispersions and natural esters like betacarotene and MCTs eliminates the off-taste associated with fat/oil carriers and allows higher usage of color.

MCTs may also be used as a release agent for encapsulated flavors. MCTs can be added to an encapsulating media to allow for faster and easier dissolution of the encapsulating media.

MCTs may also have some effect as an emulsifier since MCTs have a slight water solubility unlike concentrated fats and oils. Thus, MCTs can be mixed with the flavor and carrier to provide an easier encapsulation of flavors.

By way of example, and not limitation, examples of the present invention will now be given:

EXAMPLES

By way of example, a solution of lecithin/MCT was created. The solution comprised 63% lecithin and 37% medium chain triglycerides. The solution was created by blending MCTs obtained from Stepan Company, Maywood, N.J. under the tradename Neobee M-5 with lecithin in a homogenizer.

The resultant solution was then put into a gum formulation at 0.25% of the gum (see Example No. 2 below).

TABLE 1

|  | Ex. 1 | Ex. 2 |
|---|---|---|
| Sugar | 64.35% | 64.35% |
| Gum Base | 26.0 | 26.0 |
| Corn Syrup | 6.5 | 6.5 |
| Glycerin | 1.0 | 1.0 |
| Encapsulated Aspartame | 0.55 | 0.55 |
| Salt Solution | 0.10 | 0.10 |
| Lecithin | 0.25 | — |
| Flavor | 1.25 | 1.25 |
| Neobee M-5/Lecithin Solution | — | 0.25 |

The following contemplative examples and comparative examples are provided by way of further explanation and illustration.

The formulas listed in Table 2 comprise various contemplative sugar formulas in which MCT can be added at various levels to gum.

TABLE 2

| (WEIGHT PERCENT) | | | | | | |
|---|---|---|---|---|---|---|
|  | Ex. 3 | Ex. 4 | Ex. 5 | Ex. 6 | Ex. 7 | Ex. 8 |
| Sugar | 61.55 | 61.5 | 61.35 | 62.5 | 62.0 | 61.5 |
| Base | 19.2 | 19.2 | 19.2 | 19.2 | 19.2 | 19.2 |
| Corn Syrup | 16.9 | 16.9 | 16.9 | 16.9 | 16.9 | 16.9 |
| Peppermint Flavor | 0.9 | 0.9 | 0.9 | 0.9 | 0.9 | 0.9 |
| Glycerin | 1.4 | 1.4 | 1.4 | 0.0 | 0.0 | 0.0 |
| Neobee M-5/ Lecithin Solution | 0.05 | 0.10 | 0.25 | 0.50 | 1.0 | 1.5 |

In Table 3, dextrose monohydrate is added to a sugar formula with various levels of MCT.

TABLE 3

|  | Ex. 9 | Ex. 10 | Ex. 11 | Ex. 12 | Ex. 13 | Ex. 14 |
|---|---|---|---|---|---|---|
| Sugar | 55.65 | 55.6 | 55.45 | 56.2 | 55.7 | 55.2 |
| Base | 19.2 | 19.2 | 19.2 | 19.2 | 19.2 | 19.2 |
| Corn Syrup | 12.9 | 12.9 | 12.9 | 12.9 | 12.9 | 12.9 |
| Glycerin | 1.4 | 1.4 | 1.4 | 0.4 | 0.4 | 0.4 |
| Dextrose Monohydrate | 9.9 | 9.9 | 9.9 | 9.9 | 9.9 | 9.9 |
| Peppermint Flavor | 0.9 | 0.9 | 0.09 | 0.9 | 0.9 | 0.9 |
| Neobee M-5/ Lecithin Solution | 0.05 | 0.10 | 0.25 | 0.50 | 1.0 | 1.5 |

Examples 15–20 are the same as Examples 9–14 except that Neobee M-5 is pre-blended with the peppermint flavor and added to the gum formulation.

The following Tables 4 through 11 give examples of gum formulations demonstrating formula variations in which MCT, in the form of liquid oil, can be used.

Examples 21–25 in Table 4 demonstrate the use of MCT in low-moisture sugar formulations having less than 2% theoretical moisture:

TABLE 4

|  | Ex. 21 | Ex. 22 | Ex. 23 | Ex. 24 | Ex. 25 |
|---|---|---|---|---|---|
| Sugar | 58.75 | 58.6 | 58.3 | 52.7 | 52.4 |
| Gum Base | 19.2 | 19.2 | 19.2 | 19.2 | 19.2 |
| Corn Syrup[a] | 6.0 | 6.0 | 6.0 | 6.0 | 6.0 |
| Dextrose Monohydrate | 10.0 | 10.0 | 10.0 | 10.0 | 10.0 |
| Lactose | 0.0 | 0.0 | 0.0 | 5.0 | 5.0 |
| Glycerin[b] | 5.0 | 5.0 | 5.0 | 5.0 | 5.0 |
| Flavor | 0.9 | 0.9 | 0.9 | 0.9 | 0.9 |
| Neobee M-5/ Lecithin | 0.15 | 0.3 | 0.6 | 1.2 | 1.5 |

[a]Corn syrup is evaporated to 85% solids, 15% moisture.
[b]Glycerin and syrup can be blended and co-evaporated.

Examples 26–30 in Table 5 demonstrate the use of MCT in medium-moisture sugar formulations having about 2% to about 5% moisture.

TABLE 5

|  | Ex. 26 | Ex. 27 | Ex. 28 | Ex. 29 | Ex. 30 |
|---|---|---|---|---|---|
| Sugar | 53.35 | 53.2 | 52.9 | 52.3 | 52.0 |
| Gum Base | 19.2 | 19.2 | 19.2 | 19.2 | 19.2 |
| Corn Syrup[a] | 15.0 | 15.0 | 15.0 | 15.0 | 15.0 |
| Dextrose Monohydrate | 10.0 | 10.0 | 10.0 | 10.0 | 10.0 |
| Glycerin[b] | 1.4 | 1.4 | 1.4 | 1.4 | 1.4 |
| Flavor | 0.9 | 0.9 | 0.9 | 0.9 | 0.9 |
| Neobee M-5/ Lecithin | 0.15 | 0.3 | 0.6 | 1.2 | 1.5 |

[a]Corn syrup is evaporated to 85% solids, 15% moisture.
[b]Glycerin and syrup can be blended and co-evaporated.

Examples 31-35 in Table 6 demonstrate the use of MCTs in high moisture sugar formulations having more than about 5% moisture.

TABLE 6

|  | Ex. 31 | Ex. 32 | Ex. 33 | Ex. 34 | Ex. 35 |
|---|---|---|---|---|---|
| Sugar | 50.95 | 50.7 | 50.4 | 48.9 | 48.5 |
| Gum Base | 24.0 | 24.0 | 24.0 | 24.0 | 24.0 |
| Corn Syrup | 24.0 | 24.0 | 24.0 | 24.6 | 24.6 |
| Glycerin | -0.0 | 0.0 | 0.0 | 0.4 | 0.4 |
| Flavor | 1.0 | 1.0 | 1.0 | 1.0 | 1.0 |
| Neobee M-5/ Lecithin | 0.05 | 0.3 | 0.6 | 1.1 | 1.5 |

Examples 36-40 in Table 7 and Examples 41-50 in Tables 8 and 9 demonstrate the use of MCTs in low- and high-moisture gums that are sugar-free. Low-moisture gums have less than about 2% moisture, and high-moisture gums have greater than 2% moisture.

TABLE 7

|  | Ex. 36 | Ex. 37 | Ex. 38 | Ex. 39 | Ex. 40 |
|---|---|---|---|---|---|
| Base | 25.5 | 25.5 | 25.5 | 25.5 | 26.0 |
| Sorbitol | 50.85 | 50.7 | 50.5 | 50.0 | 48.0 |
| Mannitol | 12.0 | 12.0 | 12.0 | 12.0 | 13.0 |
| Glycerin | 10.0 | 10.0 | 10.0 | 10.0 | 10.0 |
| Flavor | 1.5 | 1.5 | 1.5 | 1.5 | 1.5 |
| Neobee M-5/ Lecithin | 0.15 | 0.3 | 0.5 | 1.0 | 1.5 |

TABLE 8

|  | Ex. 41 | Ex. 42 | Ex. 43 | Ex. 44 | Ex. 45 |
|---|---|---|---|---|---|
| Base | 25.5 | 25.5 | 25.5 | 25.5 | 26.2 |
| Sorbitol | 50.95 | 50.8 | 50.5 | 51.9 | 49.8 |
| Sorbitol Liquid* | 10.0 | 10.0 | 10.0 | 10.0 | 11.0 |
| Mannitol | 10.0 | 10.0 | 10.0 | 10.0 | 10.0 |
| Glycerin | 2.0 | 2.0 | 2.0 | 0.0 | 0.0 |
| Flavor | 1.5 | 1.5 | 1.5 | 1.5 | 1.5 |
| Neobee M-5/ Lecithin | 0.05 | 0.2 | 0.5 | 1.1 | 1.5 |

*Sorbitol liquid contains 70% sorbitol, 30% water.

TABLE 9

|  | Ex. 46 | Ex. 47 | Ex. 48 | Ex. 49 | Ex. 50 |
|---|---|---|---|---|---|
| Base | 25.5 | 25.5 | 25.5 | 25.5 | 26.0 |
| Sorbitol | 50.95 | 50.7 | 50.4 | 52.0 | 51.0 |
| HSH Syrup* | 10.0 | 10.0 | 10.0 | 10.0 | 10.0 |
| Mannitol | 8.0 | 8.0 | 8.0 | 8.0 | 9.0 |
| Glycerin** | 4.0 | 4.0 | 4.0 | 2.0 | 1.0 |
| Flavor | 1.5 | 1.5 | 1.5 | 1.5 | 1.5 |
| Neobee M-5/ Lecithin | 0.05 | 0.3 | 0.6 | 1.0 | 1.5 |

*Lycasin brand hydrogenated starch hydrolyzate syrup.
**Glycerin and HSH syrup may be blended or co-evaporated.

Table 10 shows sugar chewing gum formulations that can be made with MCTs and various types of sugars.

TABLE 10

|  | Ex. 51 | Ex. 52 | Ex. 53 | Ex. 54 | Ex. 55 | Ex. 56 |
|---|---|---|---|---|---|---|
| Gum Base | 19.2 | 19.2 | 19.2 | 19.2 | 19.2 | 19.2 |
| Sucrose | 49.4 | 48.5 | 44.4 | 43.5 | 34.4 | 43.5 |
| Glycerin | 1.4 | 1.4 | 1.4 | 1.4 | 1.4 | 1.4 |
| Corn Syrup | 14.0 | 14.0 | 14.0 | 14.0 | 14.0 | 14.0 |
| Dextrose | 5.0 | 5.0 | — | — | 10.0 | 5.0 |
| Lactose | 5.0 | 5.0 | 10.0 | 10.0 | — | — |
| Fructose | 5.0 | 5.0 | 10.0 | 10.0 | 10.0 | 5.0 |
| Invert Sugar | — | — | — | — | 10.0 | 10.0 |
| Maltose | — | — | — | — | — | — |
| Corn Syrup Solids | — | — | — | — | — | — |
| Peppermint Flavor | 0.9 | 0.9 | 0.9 | 0.9 | 0.9 | 0.9 |
| Neobee M-5/ Lecithin | 0.1 | 1.0 | 0.1 | 1.0 | 0.1 | 1.0 |

TABLE 10-continued

|  | Ex. 57 | Ex. 58 | Ex. 59 | Ex. 60 | Ex. 61 | Ex. 62 |
|---|---|---|---|---|---|---|
| Gum Base | 19.2 | 19.2 | 19.2 | 19.2 | 19.2 | 19.2 |
| Sucrose | 34.4 | 43.5 | 34.4 | 43.5 | 42.4 | 46.5 |
| Glycerin | 1.4 | 1.4 | 1.4 | 1.4 | 1.4 | 1.4 |
| Corn Syrup | 14.0 | 14.0 | 14.0 | 14.0 | 11.0 | 11.0 |
| Dextrose | 10.0 | 5.0 | 10.0 | 5.0 | 10.0 | 5.0 |
| Lactose | — | — | — | — | — | — |
| Fructose | 10.0 | 5.0 | 10.0 | 5.0 | 5.0 | 5.0 |
| Invert Sugar | 10.0 | 10.0 | — | — | 5.0 | 5.0 |
| Maltose | — | — | 10.0 | 10.0 | — | — |
| Corn Syrup Solids | — | — | — | — | 5.0 | 5.0 |
| Peppermint Flavor | 0.9 | 0.9 | 0.9 | 0.9 | 0.9 | 0.9 |
| Neobee M-5/ Lecithin | 0.1 | 1.0 | 0.1 | 1.0 | 0.1 | 1.0 |

|  | Ex. 63 | Ex. 64 |
|---|---|---|
| Gum Base | 19.2 | 19.2 |
| Sucrose | 42.4 | 36.5 |
| Glycerin | 6.4 | 6.4 |
| Corn Syrup | 11.0 | 11.0 |
| Dextrose | 5.0 | 5.0 |
| Lactose | 5.0 | 5.0 |
| Fructose | — | — |
| Invert Sugar | 5.0 | 5.0 |
| Maltose | — | — |
| Corn Syrup Solids | 5.0* | 10.0* |
| Peppermint Flavor | 0.9 | 0.9 |
| Neobee M-5/ Lecithin | 0.1 | 1.0 |

*5-25DE maltodextrin can be used.

Table 11 shows chewing gum formulations that are free of sugar. These formulations can use a wide variety of other non-sugar alditols.

TABLE 11
(WEIGHT PERCENT)

|  | Ex. 65 | Ex. 66 | Ex. 67 | Ex. 68 | Ex. 69 | Ex. 70 |
|---|---|---|---|---|---|---|
| Gum Base | 25.5 | 25.5 | 25.5 | 25.5 | 25.5 | 25.5 |
| Glycerin | 2.0 | 2.0 | 2.0 | 2.0 | 2.0 | 2.0 |
| Sorbitol | 43.9 | 43.0 | 43.9 | 38.0 | 37.9 | 39.0 |
| Mannitol | — | 10.0 | 10.0 | 10.0 | 10.0 | 6.0 |
| Sorbitol Liquid | 17.0 | 17.0 | — | — | — | — |
| Lycasin | — | — | 17.0 | 12.0 | 8.0 | 10.0 |
| Maltitol | 10.0 | — | — | 10.0 | — | — |
| Xylitol | — | — | — | — | 15.0 | 15.0 |
| Lactitol | — | — | — | — | — | — |
| Palatinit | — | — | — | — | — | — |
| Flavor | 1.5 | 1.5 | 1.5 | 1.5 | 1.5 | 1.5 |
| Neobee M-5/ Lecithin | 0.1 | 1.0 | 0.1 | 1.0 | 0.1 | 1.0 |

|  | Ex. 71 | Ex. 72 | Ex. 73 | Ex. 74 | Ex. 75 | Ex. 76 |
|---|---|---|---|---|---|---|
| Gum Base | 25.5 | 25.5 | 25.5 | 25.5 | 25.5 | 25.5 |
| Glycerin | 8.0 | 8.0 | 8.0 | 2.0 | 1.0 | 0.0 |
| Sorbitol | 41.9 | 36.0 | 31.9 | 40.0 | 26.9 | 21.0 |
| Mannitol | 8.0 | 8.0 | 8.0 | — | — | — |
| Sorbitol Liquid | 5.0 | — | — | — | — | — |
| Lycasin | — | 5.0 | 5.0 | 5.0 | 10.0 | 10.0 |
| Maltitol | — | 5.0 | — | — | — | — |
| Xylitol | — | — | — | 15.0 | 10.0 | 20.0 |
| Lactitol | 10.0 | 10.0 | 10.0 | — | — | — |
| Palatinit | — | — | 10.0 | 10.0 | 25.0 | 21.0 |
| Flavor | 1.5 | 1.5 | 1.5 | 1.5 | 1.5 | 1.5 |
| Neobee M-5/ Lecithin | 0.1 | 1.0 | 0.1 | 1.0 | 0.1 | 1.0 |

The following examples of the invention are also shown in Table 12 for natural and synthetic gum bases with wax, Table 13 for chewing gum bases that are waxfree and have some reduced tack properties, Table 14 for wax free bubble gum bases. These examples illustrate how MCTs can be added to a wide variety of chewing gum bases to partially replace some of the oils, fats, and base softeners.

TABLE 12

NATURAL AND SYNTHETIC BASES WITH WAX (WEIGHT PERCENT)

|  | Ex. 77 | Ex. 78 | Ex. 79 |
|---|---|---|---|
| Butyl Rubber | 11.7 | 10.0 | 9.0 |
| Styrene Butadiene Rubber | — | — | — |
| Polyisobutylene | — | 10.4 | 5.3 |
| Jelutong | — | — | — |
| Ester Gum | 14.8 | — | — |
| Terpene Resin | 9.9 | 6.8 | 16.7 |
| Low MW Polyvinylacetate | 21.2 | 23.2 | 24.6 |
| High MW Polyvinylacetate | — | — | — |
| Talc | — | — | — |
| Calcium Carbonate | 11.2 | 14.7 | 20.1 |
| Acetylated Monoglyceride | — | — | — |
| Hydrogenated Cotton Seed Oil | — | 10.0 | 3.3 |
| Hydrogenated Soybean Oil | 9.0 | 11.1 | 3.3 |
| Partially Hydrogenated Soybean and Palm Oil | — | 2.3 | — |
| Partially Hydrogenated Cottonseed Oil | — | — | — |
| Neobee M-5/Lecithin | 8.4 | 4.3 | 5.0 |
| Glycerol Monostearate | 4.8 | 4.1 | 4.2 |
| Triacetin | — | — | — |
| Microcrystalline Wax (MP 180° F.) | 6.0 | 3.1 | 8.5 |
| Paraffin Wax (MP 135° F.) | 3.0 | — | — |
|  | 100.0 | 100.0 | 100.0 |

BUBBLE BASES

|  | Ex. 80 | Ex. 81 | Ex. 82 |
|---|---|---|---|
| Butyl Rubber | — | — | 2.5 |
| Styrene Butadiene Rubber | 10.3 | 1.6 | — |
| Polyisobutylene | — | 9.1 | 9.0 |
| Jelutong | — | — | — |
| Ester Gum | 24.7 | 22.5 | 15.0 |
| Terpene Resin | — | — | — |
| Low MW Polyvinylacetate | — | — | — |
| High MW Polyvinylacetate | — | 30.0 | 24.1 |
| Talc | — | — | 25.4 |
| Calcium Carbonate | 56.8 | 21.7 | — |
| Acetylated Monoglyceride | — | — | 4.0 |
| Hydrogenated Cotton Seed Oil | 1.5 | — | — |
| Hydrogenated Soybean Oil | — | — | — |
| Partially Hydrogenated Soybean and Palm Oil | — | 2.0 | — |
| Partially Hydrogenated Cottonseed Oil | — | — | — |
| Neobee M-5/Lecithin | 1.5 | 1.5 | 3.5 |
| Glycerol Monostearate | 1.1 | — | 7.1 |
| Triacetin | — | 4.5 | 3.2 |
| Microcrystalline Wax (MP 180° F.) | — | — | 1.2 |
| Paraffin Wax (MP 135° F.) | 4.1 | 7.1 | 5.0 |
|  | 100.0 | 100.0 | 100.0 |

|  | Ex. 83 | Ex. 84 | Ex. 85 |
|---|---|---|---|
| Butyl Rubber | 6.8 | 6.8 | 8.8 |
| Styrene Butadiene Rubber | — | — | — |
| Polyisobutylene | 3.0 | 3.2 | 4.1 |
| Jelutong | 21.1 | 18.2 | 4.0 |
| Ester Gum | 16.7 | 16.6 | — |
| Terpene Resin | — | — | 17.3 |
| Low MW Polyvinylacetate | 16.6 | 16.1 | 25.0 |
| High MW Polyvinylacetate | — | — | — |
| Talc | — | — | 18.1 |
| Calcium Carbonate | 13.2 | 19.7 | — |
| Acetylated Monoglyceride | — | — | — |
| Hydrogenated Cotton Seed Oil | 2.3 | — | 4.5 |
| Hydrogenated Soybean Oil | — | 3.2 | 2.7 |
| Partially Hydrogenated Soybean and Palm Oil | — | — | — |
| Partially Hydrogenated Cottonseed Oil | — | 2.0 | — |
| Neobee M-5/Lecithin | 3.0 | 1.8 | 3.3 |
| Glycerol Monostearate | 2.1 | 4.5 | 4.1 |
| Triacetin | — | — | — |
| Microcrystalline Wax (MP 180° F.) | 15.2 | 6.8 | 6.1 |
| Paraffin Wax (MP 135° F.) | — | 1.1 | 2.0 |
|  | 100.0 | 100.0 | 100.0 |

|  | Ex. 86 Bubble Base | Ex. 87 | Ex. 88 |
|---|---|---|---|
| Butyl Rubber | — | 9.1 | 9.3 |
| Styrene Butadiene Rubber | — | — | — |
| Polyisobutylene | 8.0 | 3.5 | 10.5 |
| Jelutong | — | 3.1 | — |
| Ester Gum | 14.7 | 1.5 | — |
| Terpene Resin | — | 15.0 | 13.0 |
| Low MW Polyvinylacetate | — | 22.8 | 23.0 |
| High MW Polyvinylacetate | 34.5 | — | — |
| Talc | 28.6 | — | — |
| Calcium Carbonate | — | 23.0 | 14.9 |
| Acetylated Monoglyceride | 2.5 | — | — |
| Hydrogenated Cotton Seed Oil | — | 4.6 | 8.0 |
| Hydrogenated Soybean Oil | — | 2.9 | 5.2 |
| Partially Hydrogenated Soybean and Palm Oil | — | — | 3.1 |
| Partially Hydrogenated Cottonseed Oil | — | — | 1.5 |
| Neobee M-5/Lecithin | 0.9 | 3.2 | 2.1 |
| Glycerol Monostearate | 4.4 | 2.8 | 4.5 |
| Triacetin | 4.6 | — | — |
| Microcrystalline Wax (MP 180° F.) | — | 7.0 | 4.4 |
| Paraffin Wax (MP 135° F.) | 1.8 | 1.5 | 0.5 |
|  | 100.0 | 100.0 | 100.0 |

|  | Ex. 89 | Ex. 90 | Ex. 91 Bubble Base |
|---|---|---|---|
| Butyl Rubber | 6.1 | 8.1 | — |
| Styrene Butadiene Rubber | — | — | 6.0 |
| Polyisobutylene | 7.1 | 5.5 | 7.5 |
| Jelutong | — | — | — |
| Ester Gum | — | 7.1 | 12.2 |
| Terpene Resin | 14.1 | 7.1 | — |
| Low MW Polyvinylacetate | 28.1 | 22.2 | — |
| High MW Polyvinylacetate | — | — | 29.0 |
| Talc | — | — | 28.9 |
| Calcium Carbonate | 18.9 | 25.6 | — |
| Acetylated Monoglyceride | — | — | 3.7 |
| Hydrogenated Cotton Seed Oil | 10.1 | 13.2 | 2.7 |
| Hydrogenated Soybean Oil | 5.1 | 5.1 | — |
| Partially Hydrogenated Soybean and Palm Oil | — | — | — |
| Partially Hydrogenated Cottonseed Oil | — | — | — |
| Neobee M-5/Lecithin | 4.8 | 4.6 | 1.3 |
| Glycerol Monostearate | 1.5 | 1.5 | 3.1 |
| Triacetin | — | — | 1.2 |
| Microcrystalline Wax (MP 180° F.) | 3.1 | — | 4.4 |
| Paraffin Wax (MP 135° F.) | 1.1 | — | — |
|  | 100.0 | 100.0 | 100.0 |

TABLE 13

WAX-FREE GUM BASES FOR USE IN CHEWING GUM HAVING SOME REDUCED TACK CHARACTERISTICS (EXAMPLES 92–121)

GENERIC INGREDIENTS

| EXAMPLES 92-96 | | | | | |
|---|---|---|---|---|---|
| IDENTIFICATION - EXAMPLES #: | 92 | 93 | 94 | 95 | 96 |
| SYNTHETIC ELASTOMER | | | | | |
| STYRENE-BUTADIENE ELASTOMER | 5.3 | — | 2.1 | 1.8 | — |
| BUTYL (ISOPRENE-ISOBUTYLENE) ELASTOMER | 8.6 | 7.9 | 7.2 | — | 8.1 |
| POLYISOBUTYLENE ELASTOMER | 7.1 | — | 7.4 | 24.8 | 3.6 |

TABLE 13-continued

WAX-FREE GUM BASES FOR USE IN CHEWING GUM HAVING SOME
REDUCED TACK CHARACTERISTICS (EXAMPLES 92-121)

GENERIC INGREDIENTS

| | | | | | |
|---|---|---|---|---|---|
| POLYVINYL ACETATE | 10.5 | 27.2 | 15.3 | 10.1 | 27.3 |
| ELASTOMER PLASTICIZERS | | | | | |
| GLYCEROL ESTERS OF ROSIN | 2.1 | — | 19.0 | 3.7 | — |
| GLYCEROL ESTERS OF PART HYD ROSIN | 4.3 | 18.2 | — | 7.9 | — |
| TERPENE RESINS | 10.8 | — | — | 7.1 | 26.8 |
| FILLER | | | | | |
| CALCIUM CARBONATE | — | 15.9 | 20.7 | 17.7 | 11.4 |
| TALC | 25.5 | — | — | — | — |
| SOFTENER | | | | | |
| HYDROGENATED COTTONSEED OIL | — | 6.0 | — | 7.0 | — |
| HYDROGENATED SOYBEAN OIL | 4.3 | — | 6.1 | — | — |
| PARTIALLY HYDROGENATED SOYBEAN AND PALM OIL | 3.3 | — | 6.0 | — | 9.1 |
| PARTIALLY HYDROGENATED COTTONSEED OIL | — | 5.3 | — | 7.0 | — |
| NEOBEE M-5/LECITHIN | 10.0 | 12.1 | — | 9.4 | 8.9 |
| GLYCEROL MONOSTEARATE | 8.2 | 7.4 | 4.0 | 3.5 | 4.8 |
| TOTAL PERCENT | 100.0 | 100.0 | 100.0 | 100.0 | 100.0 |

EXAMPLES 97-99

| IDENTIFICATION - EXAMPLES #: | 97 | 98 | 99 |
|---|---|---|---|
| SYNTHETIC ELASTOMER | | | |
| STYRENE-BUTADIENE ELASTOMER | 5.2 | 2.1 | 5.9 |
| BUTYL (ISOPRENE-ISOBUTYLENE) ELASTOMER | 4.1 | 7.2 | 6.9 |
| POLYISOBUTYLENE ELASTOMER | 5.9 | 7.3 | 2.0 |
| POLYVINYL ACETATE | 25.7 | 15.3 | 24.8 |
| ELASTOMER PLASTICIZERS | | | |
| GLYCEROL ESTERS OF ROSIN | 23.5 | 19.1 | 8.6 |
| GLYCEROL ESTERS OF PART HYD ROSIN | — | — | 8.0 |
| TERPENE RESINS | 3.2 | — | 1.9 |
| FILLER | | | |
| CALCIUM CARBONATE | 15.1 | 20.7 | 9.9 |
| TALC | — | — | 7.2 |
| SOFTENER | | | |
| HYDROGENATED COTTONSEED OIL | — | — | 7.0 |
| HYDROGENATED SOYBEAN OIL | — | — | — |
| PARTIALLY HYDROGENATED SOYBEAN AND PALM OIL | 5.5 | 8.3 | 10.1 |
| PARTIALLY HYDROGENATED COTTONSEED OIL | 3.0 | 9.6 | — |
| NEOBEE M-5/LECITHIN | 3.7 | 6.4 | 4.0 |
| GLYCEROL MONOSTEARATE | 5.1 | 4.0 | 3.7 |
| TOTAL PERCENT | 100.0 | 100.0 | 100.0 |

EXAMPLES 100-103

| IDENTIFICATION - EXAMPLES #: | 100 | 101 | 102 | 103 |
|---|---|---|---|---|
| SYNTHETIC ELASTOMER | | | | |
| STYRENE-BUTADIENE ELASTOMER | 3.9 | 2.1 | — | — |
| BUTYL (ISOPRENE-ISOBUTYLENE) ELASTOMER | 5.3 | 6.0 | 8.9 | 3.6 |
| POLYISOBUTYLENE ELASTOMER | 12.7 | 8.5 | 10.0 | 11.1 |
| POLYVINYL ACETATE | 14.9 | 15.3 | 21.3 | 21.9 |
| ELASTOMER PLASTICIZERS | | | | |
| GLYCEROL ESTERS OF ROSIN | — | 10.1 | — | 19.6 |
| GLYCEROL ESTERS OF PART HYD ROSIN | — | 8.9 | — | 11.2 |
| TERPENE RESINS | 21.4 | — | 9.7 | 3.7 |
| FILLER | | | | |
| CALCIUM CARBONATE | 13.7 | 20.9 | 21.5 | 6.4 |
| TALC | 1.4 | — | — | — |
| SOFTENER | | | | |
| HYDROGENATED COTTONSEED OIL | — | 4.2 | — | 5.0 |
| HYDROGENATED SOYBEAN OIL | 1.7 | — | 5.0 | — |
| PARTIALLY HYDROGENATED SOYBEAN AND PALM OIL | 4.3 | 5.0 | — | 10 |
| PARTIALLY HYDROGENATED COTTONSEED OIL | — | — | 15.0 | — |
| NEOBEE M-5/LECITHIN | 15.0 | 15.0 | 3.2 | 4.2 |
| GLYCEROL MONOSTEARATE | 5.7 | 4.0 | 5.4 | 3.3 |
| TOTAL PERCENT | 100.0 | 100.0 | 100.0 | 100.0 |

EXAMPLES 104-108

TABLE 13-continued
WAX-FREE GUM BASES FOR USE IN CHEWING GUM HAVING SOME REDUCED TACK CHARACTERISTICS (EXAMPLES 92-121)

GENERIC INGREDIENTS

| IDENTIFICATION - EXAMPLES #: | 104 | 105 | 106 | 107 | 108 |
|---|---|---|---|---|---|
| **\*\*SYNTHETIC ELASTOMER\*\*** | | | | | |
| STYRENE-BUTADIENE ELASTOMER | — | 3.2 | 4.1 | — | — |
| BUTYL (ISOPRENE-ISOBUTYLENE) ELASTOMER | 7.4 | 7.3 | 11.3 | 10.0 | 8.3 |
| POLYISOBUTYLENE ELASTOMER | 1.9 | 7.5 | 7.9 | 1.9 | 3.6 |
| POLYVINYL ACETATE | 24.8 | 21.1 | 18.2 | 27.6 | 27.5 |
| **\*\*ELASTOMER PLASTICIZERS\*\*** | | | | | |
| GLYCEROL ESTERS OF ROSIN | — | 15.3 | — | — | — |
| GLYCEROL ESTERS OF PART HYD ROSIN | — | 2.4 | 26.2 | — | — |
| TERPENE RESINS | 25.8 | 5.8 | 1.4 | 25.3 | 25.3 |
| **\*\*FILLER\*\*** | | | | | |
| CALCIUM CARBONATE | 18.6 | — | 13.6 | 11.3 | 11.3 |
| TALC | — | 14.8 | — | — | — |
| **\*\*SOFTENER\*\*** | | | | | |
| HYDROGENATED COTTONSEED OIL | 2.1 | 4.4 | 1.2 | — | — |
| HYDROGENATED SOYBEAN OIL | — | — | — | 4.1 | 4.0 |
| PARTIALLY HYDROGENATED SOYBEAN AND PALM OIL | — | 4.0 | — | — | 4.2 |
| PARTIALLY HYDROGENATED COTTONSEED OIL | — | — | — | — | — |
| NEOBEE M-5/LECITHIN | 15.0 | 11.4 | 10.9 | 15.0 | 11.0 |
| GLYCEROL MONOSTEARATE | 4.4 | 2.8 | 5.2 | 4.8 | 4.8 |
| TOTAL PERCENT | 100.0 | 100.0 | 100.0 | 100.0 | 100.0 |

EXAMPLES 109-112

| IDENTIFICATION - EXAMPLES #: | 109 | 110 | 111 | 112 |
|---|---|---|---|---|
| **\*\*NATURAL ELASTOMER\*\*** | | | | |
| NATURAL GUM | 22.0 | 25.1 | 22.8 | 17.6 |
| **\*\*SYNTHETIC ELASTOMER\*\*** | | | | |
| STYRENE-BUTADIENE ELASTOMER | — | 1.9 | 2.6 | — |
| BUTYL (ISOPRENE-ISOBUTYLENE) ELASTOMER | 4.8 | 2.1 | 4.1 | 10.2 |
| POLYISOBUTYLENE ELASTOMER | 5.7 | 4.7 | 3.2 | 2.1 |
| POLYVINYL ACETATE | 16.4 | 24.8 | 16.3 | 26.9 |
| **\*\*ELASTOMER PLASTICIZERS\*\*** | | | | |
| GLYCEROL ESTERS OF ROSIN | 3.8 | 3.2 | 6.9 | 11.3 |
| GLYCEROL ESTERS OF PART HYD ROSIN | 12.3 | 12.6 | 11.8 | 4.8 |
| METHYL ESTERS OF ROSIN | — | 2.1 | 1.7 | — |
| TERPENE RESINS | — | — | — | — |
| **\*\*FILLER\*\*** | | | | |
| CALCIUM CARBONATE | — | 4.4 | 9.3 | — |
| TALC | 7.1 | — | — | 4.6 |
| **\*\*SOFTENER\*\*** | | | | |
| HYDROGENATED COTTONSEED OIL | — | — | 10.0 | — |
| HYDROGENATED SOYBEAN OIL | 5.0 | — | — | 5.6 |
| PARTIALLY HYDROGENATED SOYBEAN AND PALM OIL | 11.0 | 12.0 | 3.7 | 5.0 |
| PARTIALLY HYDROGENATED COTTONSEED OIL | 5.0 | — | — | — |
| NEOBEE M-5/LECITHIN | 0.8 | 3.3 | 7.6 | 5.6 |
| GLYCEROL MONOSTEARATE | 6.1 | 3.8 | — | 6.3 |
| TOTAL PERCENT | 100.0 | 100.0 | 100.0 | 100.0 |

EXAMPLES 113-116

| IDENTIFICATION - EXAMPLES #: | 113 | 114 | 115 | 116 |
|---|---|---|---|---|
| **\*\*NATURAL ELASTOMER\*\*** | | | | |
| NATURAL GUM | 15.7 | 22.6 | 22.2 | 21.1 |
| **\*\*SYNTHETIC ELASTOMER\*\*** | | | | |
| STYRENE-BUTADIENE ELASTOMER | 1.9 | — | — | — |
| BUTYL (ISOPRENE-ISOBUTYLENE) ELASTOMER | 3.7 | 5.8 | 5.7 | 6.1 |
| POLYISOBUTYLENE ELASTOMER | 4.1 | 3.1 | 3.1 | 2.8 |
| POLYVINYL ACETATE | 26.2 | 20.4 | 22.0 | 18.0 |
| **\*\*ELASTOMER PLASTICIZERS\*\*** | | | | |
| GLYCEROL ESTERS OF ROSIN | — | — | — | 15.7 |
| GLYCEROL ESTERS OF PART HYD ROSIN | 15.3 | 11.7 | 15.2 | — |
| METHYL ESTERS OF ROSIN | — | 4.0 | — | — |
| TERPENE RESINS | — | — | — | — |
| **\*\*FILLER\*\*** | | | | |
| CALCIUM CARBONATE | 12.2 | 11.6 | 11.4 | — |

TABLE 13-continued
WAX-FREE GUM BASES FOR USE IN CHEWING GUM HAVING SOME REDUCED TACK CHARACTERISTICS (EXAMPLES 92-121)

GENERIC INGREDIENTS

|  |  |  |  |  |
|---|---|---|---|---|
| TALC | — | — | — | 15.4 |
| SOFTENER | | | | |
| HYDROGENATED COTTONSEED OIL | — | 2.0 | — | 9.1 |
| HYDROGENATED SOYBEAN OIL | 3.0 | — | 6.2 | — |
| PARTIALLY HYDROGENATED SOYBEAN AND PALM OIL | — | 15.0 | — | — |
| PARTIALLY HYDROGENATED COTTONSEED OIL | 12.0 | — | 6.0 | — |
| NEOBEE M-5/LECITHIN | 0.1 | 0.5 | 4.9 | 6.0 |
| GLYCEROL MONOSTEARATE | 5.8 | 3.3 | 3.3 | 5.8 |
| TOTAL PERCENT | 100.0 | 100.0 | 100.0 | 100.0 |

EXAMPLES 117-121

| IDENTIFICATION - EXAMPLES #: | 117 | 118 | 119 | 120 | 121 |
|---|---|---|---|---|---|
| NATURAL ELASTOMER | | | | | |
| NATURAL GUM | 23.8 | 18.7 | 14.4 | 18.2 | 25.2 |
| SYNTHETIC ELASTOMER | | | | | |
| STYRENE-BUTADIENE ELASTOMER | — | — | — | — | — |
| BUTYL (ISOPRENE-ISOBUTYLENE) ELASTOMER | 3.1 | 6.0 | 9.1 | 6.8 | 2.4 |
| POLYISOBUTYLENE ELASTOMER | 7.7 | 5.5 | 3.6 | 5.4 | 4.9 |
| POLYVINYL ACETATE | 20.5 | 14.8 | 18.1 | 15.5 | 19.9 |
| ELASTOMER PLASTICIZERS | | | | | |
| GLYCEROL ESTERS OF ROSIN | — | — | 11.9 | — | 15.6 |
| GLYCEROL ESTERS OF PART HYD ROSIN | 10.4 | 15.5 | 13.0 | 12.7 | — |
| METHYL ESTERS OF ROSIN | 2.0 | — | — | 2.6 | — |
| TERPENE RESINS | 5.1 | — | — | — | 2.1 |
| FILLER | | | | | |
| CALCIUM CARBONATE | — | 18.8 | 14.1 | 15.7 | — |
| TALC | 5.3 | — | — | — | 7.1 |
| SOFTENER | | | | | |
| HYDROGENATED COTTONSEED OIL | — | 6.5 | 7.0 | — | — |
| HYDROGENATED SOYBEAN OIL | 7.9 | — | — | 5.0 | 10.0 |
| PARTIALLY HYDROGENATED SOYBEAN AND PALM OIL | — | — | 2.0 | — | — |
| PARTIALLY HYDROGENATED COTTONSEED OIL | — | — | — | 6.0 | — |
| NEOBEE M-5/LECITHIN | 7.9 | 6.5 | 6.8 | 5.0 | 8.4 |
| GLYCEROL MONOSTEARATE | 6.3 | 7.7 | — | 7.1 | 4.4 |
| TOTAL PERCENT | 100.0 | 100.0 | 100.0 | 100.0 | 100.0 |

TABLE 14
WAX-FREE GUM BASES FOR USE IN BUBBLE GUM (EXAMPLES 122-130)

EXAMPLES 122-125

| IDENTIFICATION - EXAMPLES #: | 122 | 123 | 124 | 125 |
|---|---|---|---|---|
| GENERIC INGREDIENTS | | | | |
| ** SYNTHETIC ELASTOMER ** | | | | |
| POLYISOBUTYLENE ELASTOMER | 17.1 | 11.7 | 11.6 | 5.4 |
| POLYVINYL ACETATE | 24.9 | 29.4 | 31.5 | 34.8 |
| ** ELASTOMER PLASTICIZERS ** | | | | |
| GLYCEROL ESTERS OF ROSIN | 6.8 | 10.7 | 19.8 | 16.3 |
| GLYCEROL ESTERS OF PART HYD ROSIN | — | — | — | — |
| ** FILLER ** | | | | |
| CALCIUM CARBONATE | — | — | — | 30.2 |
| TALC | 34.7 | 34.1 | 21.9 | — |
| ** SOFTENER ** | | | | |
| NEOBEE M-5 | 1.1 | 3.4 | 3.0 | 2.0 |
| GLYCEROL TRIACETATE | 4.6 | 4.4 | 5.0 | 5.3 |
| GLYCEROL MONOSTEARATE | 5.8 | 4.3 | 4.9 | 3.9 |
| ACETYLATED MONOGLYCERIDE | 5.0 | 2.0 | 2.3 | 2.1 |
| TOTAL PERCENT | 100.0 | 100.0 | 100.0 | 100.0 |

EXAMPLES 126-130

| IDENTIFICATION - EXAMPLES # | 126 | 127 | 128 | 129 | 130 |
|---|---|---|---|---|---|
| GENERIC INGREDIENTS | | | | | |
| ** SYNTHETIC ELASTOMER ** | | | | | |
| POLYISOBUTYLENE ELASTOMER | 7.9 | 13.0 | 7.9 | 11.6 | 11.8 |
| POLYVINYL ACETATE | 34.2 | 37.1 | 34.2 | 37.8 | 35.6 |

TABLE 14-continued
WAX-FREE GUM BASES FOR USE IN BUBBLE GUM
(EXAMPLES 122-130)

| ** ELASTOMER PLASTICIZERS ** | | | | | |
|---|---|---|---|---|---|
| GLYCEROL ESTERS OF ROSIN | 14.8 | — | — | — | — |
| GLYCEROL ESTERS OF PART HYD ROSIN | — | 19.8 | 14.8 | 19.8 | 19.8 |
| ** FILLER ** | | | | | |
| CALCIUM CARBONATE | 29.8 | 16.5 | 29.8 | — | — |
| TALC | — | — | — | 17.0 | 19.7 |
| ** SOFTENER ** | | | | | |
| NEOBEE M-5 | 0.5 | 1.5 | 1.0 | 2.6 | 0.8 |
| GLYCEROL TRIACETATE | 5.3 | 5.6 | 4.3 | 3.0 | 4.0 |
| GLYCEROL MONOSTEARATE | 4.5 | 6.5 | 5.0 | 3.2 | 2.3 |
| ACETYLATED MONOGLYCERIDE | 3.0 | — | 3.0 | 5.0 | 6.0 |
| TOTAL PERCENT | 100.0 | 100.0 | 100.0 | 100.0 | 100.0 |

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

We claim:

1. A chewing gum formulation comprising:
   an insoluble gum base;
   a water soluble portion;
   a flavor; and
   at least 0.1% by weight of a blend of lecithin and medium chain triglycerides.

2. The chewing gum formulation of claim 1 wherein the ratio of lecithin to medium chain triglycerides is approximately 1:10 to about 1:1.

3. The chewing gum formulation of claim 1 wherein the medium chain triglycerides are obtained from coconut oil.

4. The chewing gum formulation of claim 1 wherein the formulation includes a bulk sweetener.

5. The chewing gum formulation of claim 1 wherein the formulation includes a high intensity sweetener.

6. The chewing gum formulation of claim 1 wherein the formulation includes an emulsifier.

7. The chewing gum formulation of claim 1 wherein the formulation includes an elastomer plasticizer.

8. The chewing gum formulation of claim 1 wherein the formulation includes an elastomer.

9. A gum base comprising:
   an elastomer; and
   at least 2.5% by weight of a blend of lecithin and medium chain triglycerides.

10. The gum base of claim 9 wherein the base is wax-free.

11. The gum base of claim 9 wherein the base is non-tacky.

12. The gum base of claim 9 wherein the base is a bubble gum-type base.

13. The gum base of claim 9 including at least one resin.

14. The gum base of claim 9 wherein the ratio of lecithin to medium chain triglycerides is approximately 1:10 to about 10:1.

15. A method for creating chewing gum comprising the steps of:
   mixing lecithin with medium chain triglycerides to create a blend; and
   adding the blend to other chewing gum ingredients to create a chewing gum.

16. The method of claim 15 wherein the ratio of lecithin to medium chain triglycerides in the blend is approximately 1:10 to about 1:1.

17. The method of claim 15 wherein the blend comprises 0.1 to 1.5% of the chewing gum formulation.

18. A method for dissolving lecithin comprising the steps of blending lecithin with medium chain triglycerides.

19. The method of claim 18 wherein the ratio of lecithin to medium chain triglycerides in the blend is approximately 1:10 to about 10:1.

20. The method of claim 18 wherein the medium chain triglycerides are obtained from coconut oil.

* * * * *